United States Patent [19]
Johnson et al.

[11] 3,940,733
[45] Feb. 24, 1976

[54] SEISMIC SURVEILLANCE SYSTEM

[75] Inventors: Ronald F. Johnson, Oakhurst; Kurt Ikrath, Elberon, both of N.J.

[73] Assignee: The United States of America as represented by the Secretary of the Army, Washington, D.C.

[22] Filed: June 25, 1974

[21] Appl. No.: 482,947

[52] U.S. Cl. .............. 340/15; 340/16 R; 340/258 B
[51] Int. Cl.² ................. H04B 11/00; G01S 3/80
[58] Field of Search .... 340/258 R, 258 B, 15, 16 R, 340/15.5; 181/108, 139; 47/DIG. 12

[56] References Cited
UNITED STATES PATENTS

| | | | |
|---|---|---|---|
| 1,549,032 | 8/1925 | Squier | 47/1.3 |
| 3,302,746 | 2/1967 | Ikrath | 340/16 R |
| 3,646,562 | 2/1972 | Acker et al. | 343/895 |

*Primary Examiner*—Maynard R. Wilbur
*Assistant Examiner*—S. C. Buczinski
*Attorney, Agent, or Firm*—Nathan Edelberg; Robert P. Gibson; Arthur L. Bowers

[57] ABSTRACT

A seismic surveillance system for detecting intruders, and the like. A seismic transmitter coupled to the trunk of a tree establishes a seismic field in the earth via the roots of the tree. A seismic receiver similarly coupled to another tree detects the field and the presence of an intruder on the earth in which the field is established is detected by noting changes in the phase, amplitude, or frequency of the seismic field.

11 Claims, 3 Drawing Figures

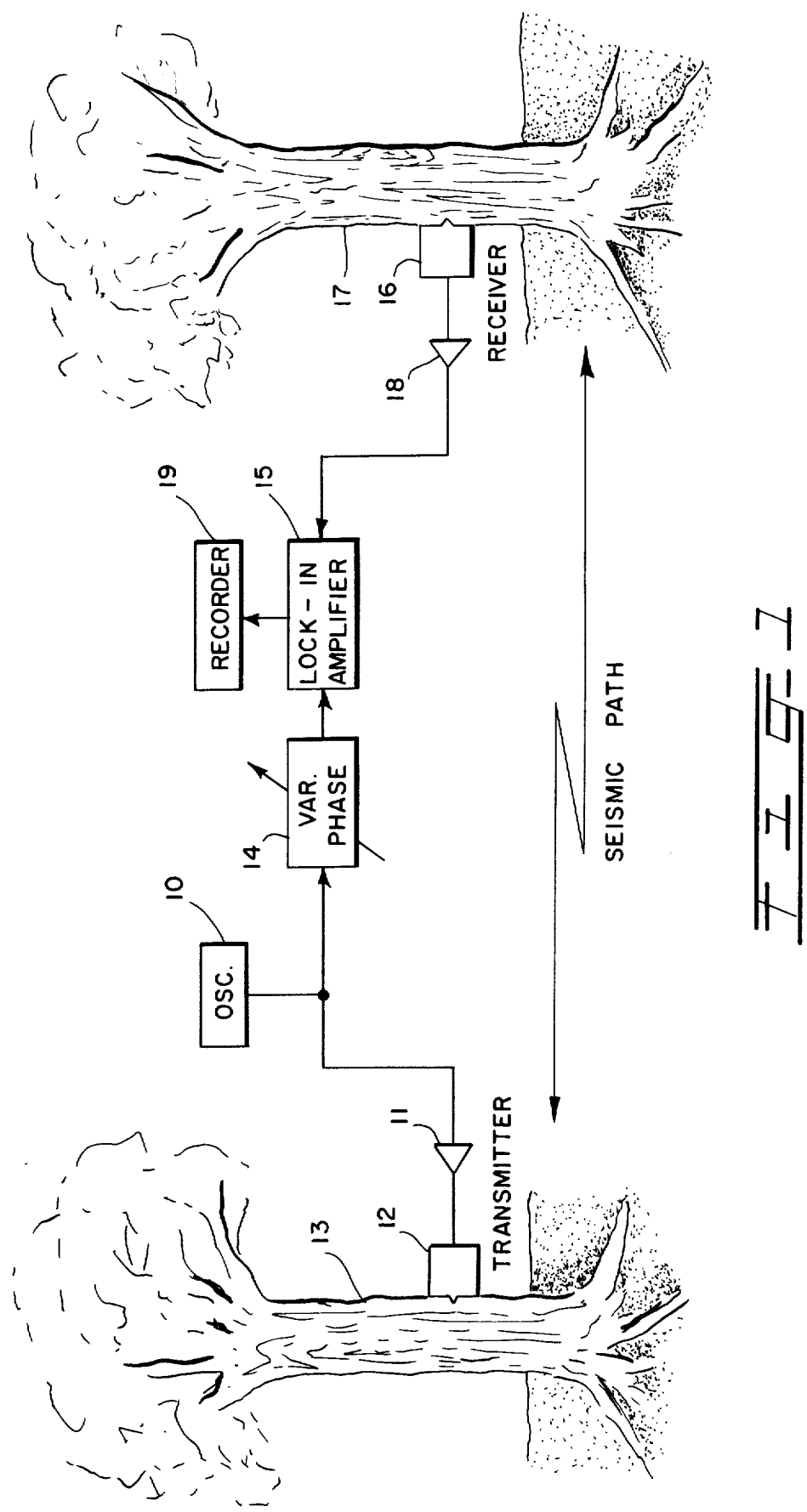

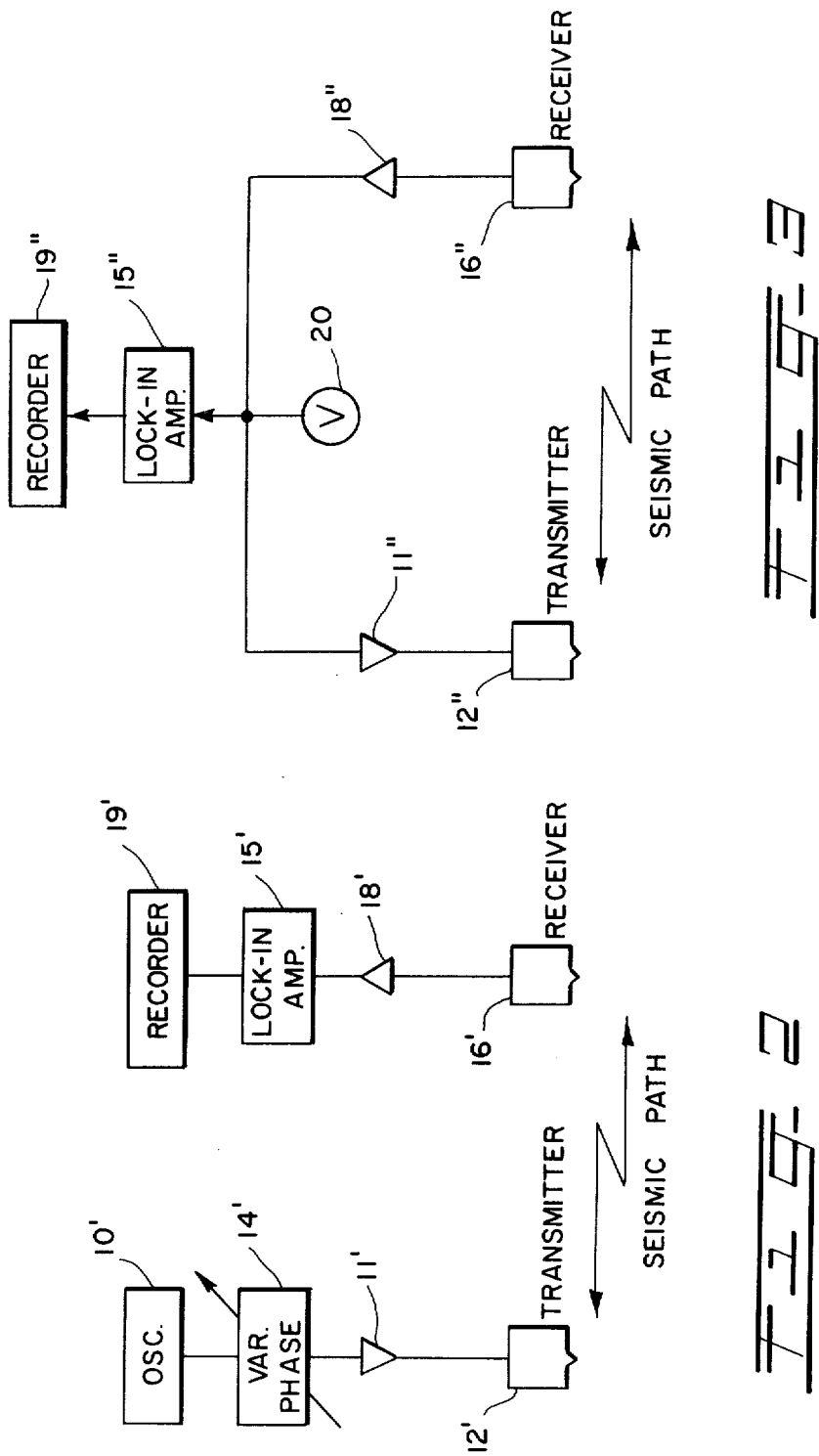

3,940,733

SEISMIC SURVEILLANCE SYSTEM

GOVERNMENT LICENSE

The invention described herein may be manufactured and used by or for the Government for governmental purposes, without the payment of any royalties thereon or therefor.

BACKGROUND OF THE INVENTION

1. Field of the Invention

Broadly speaking, this invention relates to seismic surveillance systems. More particularly, in a preferred embodiment, this invention relates to a seismic surveillance system in which the seismic transducers and receivers are coupled to the earth by means of selected, naturally growing vegetation found in the area to be surveilled.

2. Discussion of the Prior Art

Experimental seismic surveillance systems for detecting static and dynamic objects on or below the surface of the soil are known. Essentially, these experimental systems established a "seismic fence" for intrusion detection. Intruding vehicles or personnel passing between the seismic transducers which set up the "fence" were detected as a disturbance in a delicately balanced seismic loop.

A microseismic surveillance system can, in general, employ two methods of seismic excitation: (1) a transient impulse; or (2) a continuous seismic wave (CSW).

Although the transient impulse method could, in theory, be employed, it has not proved to be really practical, for many reasons, including the high cost and unreliability of the seismic impulse generators and the exceedingly complex nature of the return signals which are generated by the transient excitation.

Unfortunately, great difficulty has been experienced in coupling CSW transducers to the earth. If the transducer is merely placed on the earth, a very inefficient coupling is achieved and the area of contact is, of course, limited by the geography of the transducer. Further, in wet, marshy terrain, such as is frequently found in the jungle where seismic surveillance is of greatest importance, prior art transducers merely wallow in the mud and couple practically no seismic signals into the ground.

SUMMARY OF THE INVENTION

As a solution to this, and other problems, a first embodiment of the invention comprises a method of detecting the presence of an intruder in an area under surveillance. The method comprises the step of first seismically exciting the trunk of an arboreal plant growing in the area, thereby to propagate a seismic wave in the earth via the roots of the plant, and then detecting the seismic wave through seismic vibrations coupled from the earth to the trunk of a second arboreal plant growing in the area, via the roots of the plant. Next, the phase of the detected seismic wave is compared with the phase of the exciting wave and then the presence of the intruder is detected by the changes induced in the relative phase of the two compared waves as the intruder walks on the earth through which the seismic wave is propagating.

To practice the above method an illustrative surveillance system comprises a seismic transmitter for mounting to the trunk of an arboreal plant growing in the area under surveillance and means for exciting the seismic transmitter whereby a seismic wave is propagated into the earth via the roots of the arboreal plant. The system further includes a seismic receiver for mounting to the trunk of a second arboreal plant growing in the area, the receiver detecting the seismic wave through vibrations coupled from the earth to the trunk via the roots of the second plant, and means, connected to the exciting means and the seismic receiver, for comparing the phase of the seismic wave as transmitted with the phase thereof, as received, and detector means, connected to the phase comparing means, for detecting the presence of the intruder by detecting changes in the relative phase of the transmitted and received seismic wave.

The invention and its mode of operation will be more fully understood from the following detailed description and the appended drawings, in which:

DESCRIPTION OF THE DRAWINGS

FIG. 1 is a partially schematic, partially diagrammatic illustration of a first seismic surveillance system according to the invention;

FIG. 2 is a schematic drawing of an alternate embodiment of the invention which utilizes amplitude and frequency modulation techniques; and FIG. 3 is a schematic drawing of yet another embodiment of the invention which uses a Doppler frequency shift technique.

DETAILED DESCRIPTION OF THE INVENTION

Any theoretical analysis of interaction phenomena between CSW signals propagated along the surface of the soil and objects in contact with the soil requires the conception of an idealized theoretical model. In practice, one records changes in the amplitude and in the relative phase of CSW signals, in response to local variations of the soil surface conditions. In particular, variations caused by men and vehicles which involve localized loading of the soil surface, as well as local changes of the soil surface, contours by tracks and ditches, and associated local compaction of the soil are of interest.

To obtain a quantitative insight into the complicated mechanism of the interaction of primary and secondary radiators of seismic waves on actual seismic media, a high degree of idealization of the primary and secondary radiator and the medium is necessary. Nonlinear inelastic properties of the actual medium must be neglected. The mechanical and structural properties of the medium must be simplified to permit an explicit specification of the model in mathematical terms. Further, the wave excitation force distribution (primary radiator) and the surface load distribution (secondary radiator) which form the boundary conditions for the medium must be simple so as to permit explicit solution of the resultant integral equations for the displacements of the medium surface, i.e., the CSW signal.

For these reasons, the theoretical model we shall use is specified by the following derivation.

Consider an elastic half-space with given mass density in kg/m$^3$ and intrinsic velocities $c_1$ and $c_2$ (m/sec) for the longitudinal (pressure) and transverse (shear) waves, respectively. The upper boundary of the elastic half-space, constituted by the $xy$ plane, is subjected to an oscillatory ($e^{+j\omega t}$) drive force of frequency $f = w/2$ (sec$^{-1}$) acting perpendicular to the $xy$ plane along the Z direction and to a loading force from a mass at some distance $x_1$ from the drive force location at $x = 0$. The drive force and the load produce a dynamic stress distribution ($\sigma zz$) and ($\tau xy$) on the elastic half-space, which depends on x (meters) only and not on y (meters). These stress distributions, corresponding to a line source and a line load along the y direction, are expressed by the following boundary conditions:

$$(\sigma_{zz})_{z=0} = \sigma_o(x) = -P_o(x) - m_1(x) \, w^2 \, w_o(x) \quad (1)$$
$$(\tau_{xy})_{z=0} = \tau_o(x) = -m_1(x) \, w^2 \, \mu_{o(x)} \quad (2)$$

Here $\mu_o(x)$ and $w_o(x)$ are the unknown horizontal and vertical vibration amplitudes of the surface of the elastic half-space in meters. $P_o(x)$ is the given source stress distribution in N/m², $m_1(x)$ is the given load mass distribution in kg/m², $\sigma_{ZZ}$ and $\tau_{xy}$ are the normal and the shear stress in N/m².

Application of Fourier integral methods for the solution of this two-dimensional dynamic stress-strain boundary value problem leads to integral equations for $\mu$ and w. Standard procedures of setting up the Fourier integrals for the displacements $\mu$ and w are employed. To solve the integral equations, it is assumed that drive force and load mass are concentrated along a line $x = 0$ and $x = x_1$, respectively, with a corresponding delta function distribution of $P_o(x)$ and $m_1(x)$. This provides an explicit solution for: (1) The vertical surface displacement component $w_o(x)$ as a function of $P_o$, (2) The amplitude of the concentrated line force (N/m) along y, (3) $M_1$ (kg/m) the concentrated mass line load, (4) The location $x_1$ (meters) of the load $M_1$, (5) The location of the detector, and (6) The frequency $\omega$ (rad/sec). The solution may be expressed as a ratio of the change $\Delta w_o$ of the vertical surface displacement component $w_o$, caused by the load $M_1$ at $x_1$, relative to the displacement component for zero load ($w_o$).

The above-discussed equation reveals the possibility of a resonance condition between the load ($M_1$) and the elastic medium. This condition occurs for the value ($\alpha$ a²/n)²>1 at corresponding resonance frequencies:

$$\omega_1^2 = 2PC_2^2/M_1 \cdot m^2 - 1/m^2 + 1,$$

and $$\omega_2^2 = 2PC_2^2/M_1.$$

Operating at either of these frequencies without damping by friction, infinitely large values of the surface displacement would be reached by the mass $M_1$ at the location $x_1$. In practice, friction and inelastic behavior of the soil limit the displacement amplitude at the resonance condition. Thus, instead of a purely inertial loading of the medium surface by a corresponding mechanical impedance $$Z_1 = j\omega M_1,$$

in general, a mechanical load impedance, $$Z_1 = j\omega M_1 + R_1 + 1/j\omega c_1$$

occurs where the frictional resistance $r_1(x)$ and compliance $c_1(x)$, with respect to vertical and horizontal motion, need not be equal. Introduction of general mechanical load impedances $Z_1\mu$ and $Z_{1w}$ into the boundary conditions (Equations 1 and 2) leads to a high degree of mathematical sophistication of the theoretical model. This sophistication may become necessary in the future for study of the "seismic signatures" from various objects which interact with the CSW signals of active seismic surveillance systems employing tunable transducers.

Partial blocking of the seismic wave propagation by a surface object permits the mass load $M_1$ or rather $wM_1$ to approach infinitely large values. Under these conditions, the equation assumes a simple format independent of $M_1$. In the limit the relative change of the CSW signal, $$\lim_{M_1 \to \infty} \alpha \left[ \Delta w_o / (w_o) M_1 = 0 \right]$$

is only a function of the mechanical properties of the medium, the location $x_1$ of the block and X of the detector.

The usefulness of a theoretical mathematical model can be confirmed by introduction of practical numerical values for the various parameters and comparison of calculated values representing the change of CSW signal phase, as function of loading of the ideal model medium, with actual values observed in the field. We have chosen for this purpose the following numerical values for the mechanical bulk properties of the model medium:

| | |
|---|---|
| Mass Density: | $\rho = 2 \cdot 10^3$ kg/m³ |
| Pressure Wave (Longitudinal Velocity): | $c_1 = 500$ m/sec; $n = c_1/c_2 = 2$ |
| Shear Wave (Transverse) Velocity: | $c_2 = 250$ m/sec |
| Modulus of Rigidity: | $\mu = \rho \, c_2^2 = 1.25 \times 10^6$ N/m³ |
| CSW Operating Frequency: | $f = 80$ Hz ($\omega = 500$ sec⁻¹) |

These values are typical for the weathered zone of sandgravel type soil and are about equal to those measured with our nominal 80 cps CSW transducers at various experimental sites employed. See, for example, W. M. Ewing, W. Jardetzky, and F. Press, Elastic Waves in Layered Media (McGraw-Hill Book Company, Inc.), New York, 1957, and J. J. Jakosky, Exploration Geophysic (TRIJA), Newport Beach, California, 1950, second edition.

A concentrated load mass of $M_1 = 10^3$ kg/m was chosen. Mathematically, $M_1$ represents a mass of $10^3$ kg/m concentrated along a line $x = x_1$ in the y direction. This can also be interpreted as a load distributed over a very narrow strip in the vicinity of line $x = x_1$, whose width is much smaller than the wavelengths. In this case the shear wavelength is $\lambda_2 = 250/80 = 3.14$ m, so that 10 cm would be a permissible value for the width of the strip. $M_1$ can then be considered to correspond to a rigid mass load distribution of $m = 1$ kg/cm² confined to the 10-cm wide strip. If the distances of the load and of the CSW signal detector from the CSW signal source are sufficiently large to permit the incident seismic wave fronts to be approximately planar, then the two-dimensional theoretical model and the chosen numerical parameter values describe the following practical situation: the intrusion of a vehicle of medium weight into the CSW surface transmission path between the transmitter and the receiver transducer of the experimental active seismic surveillance system deployed on sand-gravel type soil. Hence, one should expect calculated values for the relative phase of the received seismic signal, as a function of the mass load $M_1$, to be of the same order of magnitude as those observed in the field in comparative situations. Also variation $x_1$ of the location of the load $M_1$ with constant velocity $v_1$, should yield a corresponding Doppler frequency modulation of the received CSW signal. In this connection, an essential difference between the seismic Doppler phenomena and similar radio Doppler frequency shift phenomena, associated with the motion of secondary seismic and radio wave radiators, is of great practical importance for seismic surveillance. The existence of several seismic propagation modes and their relative dominance in different distance zones from the CSW source, makes the observed seismic Doppler frequency modulation of the received signal dependent on the distance of the seismic secondary radiator from the primary CSW signal source.

In practice, we can distinguish a dominant shear zone near the transmitter, a dominant pressure transition zone, and a far zone, where, depending on the structure of the medium, we find that the Rayleigh wave mode or in the case of the weathered zone, a ducted seismic wave mode, is dominant. Hence, when the secondary radiation is moving through the pressure transition zone of the primary CSW radiator, what is observed in the far zone is actually a differential Doppler phenomenon involving the velocity of the pressure wave relative to the surface wave. Since there is interference between the various CSW propagation modes, distinct CSW signal minima occur in certain distance regions from the primary source. Moving through these narrow regions of minimum primary CSW signal strength, the secondary radiator creates a correspondingly smaller disturbance of the received CSW signal. In this way, the knowledge of the spatial CSW signal distribution in a certain area around the CSW source can be used to deduce the path of the intruding object from the phase or Doppler frequency modulation recording. A practical implementation of the surveillance principle above discussed is a seismic oscillator circuit that yields beat frequency recordings. This circuit will be discussed in detail below. We will discuss the calculations that concern the variation of the relative phase and Doppler frequency modulation of the received CSW signal in response to the position $x_1$ and velocity $v_1$ of the $M_1 = \infty$ load on the previously specified medium.

If the distance $x_1$ of the load $M_1 = \infty$ and x of the detector are in the surface wave far zones of both the CSW primary transmitter and the secondary radiator ($M_1$), then the relative phase change of the received CSW signal (vertical surface vibration amplitude at X) is found as:

$$\Delta\phi 8 = \arctan \frac{\frac{\sqrt{8.4}}{X_1^{3/2}} \sin(1.15\ X_1 + 1.13\ \pi)}{1 + \frac{\sqrt{8.4}}{X_1^{3/2}} \cos(1.15\ X_1 + 1.13\ \pi)}$$

By formulation of:
$d\Delta\phi/dX_1 = d\Delta\phi/dt \cdot dt/dX_1 = \Delta\omega/v_1 = 2\pi\Delta f/v_1$, one finds the corresponding Doppler frequency modulation of the received signal in Hz/m sec,
$\Delta f/v_1 = d(\Delta\phi)/2\pi dX_1$ and $(\phi_8)_{max}$
which has extremum value at $|\Delta f/v_1| = 0$. Thus, a vehicle moving at $v_1 = 4m/\text{sec}$ (approximately 10 mph) in the vicinity of $X_1 \approx 2$ would produce a Doppler modulation frequency. We note in this case, where the object and receiver are in the surface wave far zones, the absolute distance $x_1$ does not enter into the formulas of the two-dimensional model for either the phase change or Doppler modulation frequency of the received signal.

Therefore, consider the case where the secondary radiator, the load mass $M_1$, is at a distance $x_1$ within the dominant pressure mode transition region of the primary CSW signal and the detector is at a distance x within the far zone of both the primary and second radiator. We then find the relative phase change ($\Delta\phi$) of the received CSW as:

$$\Delta\phi = \arctan \frac{2.3 \cos 1.15\ X_1 - 1.49 \sin 1.15\ X_1 = 0.182\ [\cos(2.15\ X - X_1) \sin(2.15\ X - X_1)]}{X_1^{3/2} - 1.49 \cos 1.15\ X_1 - 2.3 \sin 1.15\ X_1 + 0.182\ [\cos(2.15\ X - X_1) + \sin(2.15\ X - X_1)]}$$

Here, care must be exercised with respect to the validity range of $x_1$, which is constrained by dominance of the pressure mode term over the shear and surface wave mode terms in the series expansion approximation and for the CSW signals as function of distance from the source. For a more general formula, one would have to consider contributions from all the wave mode terms (shear, pressure, and surface wave), however, for the present purpose this effort is not justified. If we assume that the range $x_1$ for the pressure transition region is $2 > x_1 > 10$ meters, all the cosine and sine terms in the denominator relative to $(x_1)3/2$ may be neglected, keeping in the numerator the first two cosine and sine terms only, since these involve the differences of the surface wave and pressure numbers:

$k_o - k_1 = \omega/c_o - \omega/c_1 = 2.15 - 1 = 1.15$ (meters)$^{-1}$.

Using these simplifications, we obtain:
$\Delta\phi = \arctan 1/X_1^{3/2}[2.3 \cos 1.15\ X_1 - 1.49 \sin 1.15\ X_1]$ and similarly, as before, one obtains a Doppler frequency modulation ($\Delta f/v_1$) of the received CSW signal due to movement of $M_1$ with velocity $v_1$ as:

$(\Delta f/v_1) = -1/X_1^{3/2} \{[0.55/X_1 + 0.272] \cos 1.15\ X_1$ $+ [0.355/X_1 - 0.425] \sin 1.15\ X_1$ Here we speak of an actual differential Doppler frequency modulation of the transmitted CSW signal, in response to movement of $M_1$ in the primary pressure zone, and reception of the signal in the primary and secondary surface wave zones. As pointed out before, the differential Doppler modulation frequency of the received CSW signal depends directly on the distance $X_1$ of $M_1$ and changes rapidly with distance.

Results of these calculations, in respect to the order of magnitude of the numerical values of the phase change and the Doppler modulation frequency, agree with experimentally observed phenomena and measurements.

In practice, the three-dimensional situations being dealt with cannot be described adequately by a two-dimensional theoretical model. The two-dimensional model is adequate for situations where the intruding object is placed or moved along a geometrical line between the CSW transmitter and receiver and where the distances are sufficiently large for the wave fronts to be approximately planar. However, even then the distance dependence of the CSW signal has to be upgraded by introducing a factor $x^{-1/2}$ into the formulas of the two-dimensional theoretical model. Nevertheless, results of the experiments using the two-dimensional theoretical model are useful for the following discussion regarding what we have termed "microseismic fence action" of active seismic surveillance systems.

When an intruding object approaches the CSW surface transmission path between the CSW transmitter and receiver at an oblique angle, the object becomes a secondary radiator, i.e., a block or absorber, whichever the dominant characteristic of its mechanical contact impedance with the soil may be. The object's presence will be most prominently sensed by variation of the received CSW signal whenever its interaction with the primary CSW signal is greatest. For the weathered zone, this disturbance is greatest when the distances between the primary CSW source and the receiver are shortest, in the sense of least loss along the paths. In areas of rather dense vegetation, where scatter losses of the CSW signal in the top soil are severe, one observes a much sharper response of the system to objects moving across the transmission path. This can be seen theoretically by referring to the distance dependence of the seismic Doppler modulation frequency in the three-dimensional case. Scatter loss by vegetation will introduce exponential decay of CSW signals plus exponential dependence of the relative phase variation and Doppler modulation frequency signal received from the radial distance of the object and detector from the CSW source. Hence, we experience a sharp response of the system only when the object crosses over a very narrow strip along the transmission path forming the microseismic fence. The performance of active surveillance systems in the underbrush terrain of the test area employed is extremely interesting. Here, loading by an object is transmitted over a larger soil area by the root systems of the vegetation. This seems to offset the effects of higher CSW signal losses and corresponding lower primary signal amplitudes interacting with the object. Choice of the 80 cps operating frequency of the active seismic system and the spectrum distribution of the natural seismic noise also deserves further comment when one considers the effects of noise on conventional passive seismic surveillance systems. Natural microseismic noise produced by the motion of the root systems of bushes and plants in response to wind is peaked at the natural frequencies of the plants, which are well below 80 cps. Passive seismic surveillance systems rely on the seismic disturbance producing activities of a dynamic object and use wideband receivers which respond to frequencies as low as 10 Hz. The user has to discriminate between natural noise and manmade disturbances, which in areas of dense vegetation, are transmitted into the soil via the roots of the bushes and plants. Because of their natural common transducer characteristics and equality of energy levels, such discrimination is at best very difficult and unreliable. In an active seismic surveillance system, there is a clear distinction between the seismic carrier signal and its quasi-static modulation in a narrow frequency band.

Since experimental recordings and theoretical models can explain only a limited amount of the phenomena occurring in active seismic systems for surveillance, seismic modeling techniques were employed to make the interaction between objects and CSW signals visible.

Distortion of seismic wave patterns by the wheels of a car on the soil surface was modeled using a laboratory designed Strobo Polariscope, photoelastic gelatin simulating the soil, and toy cars. The resultant wave patterns were detected as stress fringes in the photoelastic gelatin layers. Knowledge of wave propagation immediately reveals the similarity between wave patterns in the upper, softer gelatin layer and those in electromagnetic waveguides. The Strobo Polariscope displays only the transverse shear waves. Once the duct concept has been accepted, the analogy between the tapping of the duct by a toy car and/or blocking of the duct by a different medium (block located to the right in the upper gelatin layer) and the tapping of an electromagnetic waveguide or transmission line by a slot or stub and/or their termination with various loads, becomes self-evident. Considering that the weathered zone, modeled by the soft upper gelatin layer, acts as a duct or waveguide for seismic waves, one is tempted to apply familiar electromagnetic transmission line concepts and methods to the theoretical discussion of the performance of active seismic systems surveillance. A detailed inspection also reveals the static stress pattern under the wheels of the toy car. Consider the effects of the vehicle as an external mechanical load impedance or an internal local variation of the mechanical properties f the mechanical transmission line induced by static stress/strain from the vehicle. Investigations of the performance of transducer arrays for control of the direction of radiated CSW beams and/or excitation of ducted CSW propagation modes were undertaken, and proved successful.

Various experimental CSW surveillance systems were constructed and tested. These systems were shown to be workable. The field tests showed that after a seismic propagation surveillance system had been set up in an area, and then disturbed, the perturbation so produced could be detected without difficulty.

The numerical values, with regard to phase shift and Doppler frequency modulation, obtained from solution of the idealized theoretical model and numerical values of phase shift and Doppler frequency obtained in experimental field tests, agree in order of magnitude. The field tests also verify that a surveillance system using phase shift and/or Doppler frequency modulation as the basis for recognition of a disturbance in an area is feasible.

During the course of these experiments it was discovered that a seismic transducer fastened to a tree will transmit a seismic wave into the earth via its root system. By fastening the transducer to the tree a much greater efficiency is obtained in inseerting the signal into the soil then by placing a transducer directly on the earth. The transducer on the tree efficiently transmits a signal into the tree because of its hardness and the tree passes the signal into the earth through the greater area of its root system. This signal propagates in the soil and excites the roots of other trees, thus, an entire woods becomes seismically excited.

The tree may be tuned to frequency by adjusting the height of the transducer on the tree, thus allowing more efficient operation. Several trees may be excited to form phased arrays to produce a seismic field of controlled propagation direction.

Initial experiments were made by fastening a commercial sound transducer to a tree, however, a transducer designed especially for application on trees will be more efficient.

With this system larger seismic communications ranges can be attained in previously lossy terrain. Also seismic signals may now be inserted in wet marshy areas where transducers placed on the ground just wallow in the mud.

For surveillance this method improves both the static and dynamic systems. Statically, a receiver transducer coupled to a tree will be more efficient because it couples to the soil by the tree's root system, rather than the present geophones which detect only with their bases on regions which could be decoupled seismically. A dynamic surveillance system will be improved by the greater coupling efficiency.

FIG. 1 depicts a first illustrative surveillance system according to the invention.

As shown, the system comprises an audio oscillator 10 connected, via an amplifier 11, to a piston transducer 12 fastened to the trunk of a tree 13, or other suitable vegetation. The output of oscillator 10 is also applied, via a variable phase shifter 14 to the input of a lock-in amplifier 15, as a reference signal. The CSW output of a receiving transducer 16, also mounted to a tree 17 is fed, via an amplifier 18, to the lock-in amplifier 15 for comparison with the reference signal. The results of this comparison are recorded on a display device 19, such as a graphical pen recorder. In operation, the oscillator was adjusted to have an output frequency of 77.5 Hz. A CSW signal was then transmitted through the earth from the roots of tree 13 to the roots of tree 17 where it was received by transducer 16. The phase shifter 14 was then adjusted until a null was detected by amplifier 15 and displayed on recorder 19.

Experiments confirmed that the technique most sensitive for detection of surface objects and anomalies was that obtained by use of the circuit shown in FIG. 1 and which relies on phase comparison. The seismic feedback surveillance system so constructed acts as an open loop circuit where the phase difference between the transmitted and received signals remains constant. The output of the amplifier 15 is fed into the recording device where the phase null indication is recorded. Discounting electronic system drift, this null indication will be observed so long as the seismic propagation path is not disturbed or upset. If a perturbation should occur, an indication is immediately given by an abrupt change in the signal displayed by the recorder.

With no disturbance of the seismic path, a steady continuous CSW signal with respect to amplitude and phase was displayed on the recorder. A man then approached perpendicular to the seismic transmission path and crossed the path 13 meters from the transmitter. As the man crossed the seismic path, an abrupt change appeared on the recorder. This change corresponds to a disturbance in the seismic path and a phase change in the system. After crossing the seismic path, the subject continued for approximately 10 meters, then reversed his direction to cross the seismic path again, this time rolling a 100 lb. barrel. As he crossed the seismic path, a second phase shift was recorded. The man and barrel then remained on the seismic path.

When the man and barrel left the seismic path, the seismic system did not return its original balanced condition. A small offset from the original balance point was measured by rebalancing the system with the precision phase shift 14. The residual phase shift that had been introduced into the system by the man and barrel was found to be 8°.

In another experiment, the seismic system was again balanced and a steady-state condition was achieved. The man then rolled the barrel along the 33-meter axis between the transmitter and receiver. As this was done, a disturbance of the system was again displayed on the recorder. After completion of this experiment, the system was rebalanced and the permanent change in the seismic soil transmission path was found to be 10°.

FIG. 2 depicts another illustrative embodiment of the invention which employs frequency and amplitude modulation principles. As shown, the output of an oscillator 10' is fed through a variable phase circuit 14' and an amplifier 11' to a transmitting piston transducer 12'. As in FIG. 1, oscillator 10' has an output frequency of 77.5 Hz. The output of a receiving transducer 16' is fed, via an amplifier 18' to a lock-in amplifier 15' where it is heterodyned with a signal derived from an internal oscillator. The heterodyned signal is then fed to a recording device 19'. Trees 13 and 17 have been omitted from FIG. 2, but are still advantageously employed to couple the seismic signals into and out of the earth.

The signal from amplifier 15 is displayed as a smooth sine wave whose period is constant if the electronic system drift is negligible and no disturbance of the seismic path occurs. If a disturbance does occur, an indication is immediately given as a frequency and amplitude modulation superimposed upon the steady-state signal.

In operation of the circuit shown in FIG. 2, a smooth steady signal was displayed upon the recorder paper when the seismic path was undisturbed. A man then approached the path between the transducers at a right angle thereto. When he came in line with the transmitter and receiver transducer, he made a 90° left turn and then walked toward the receiver. An amplitude and frequency modulation of the system was caused by the intruder, which produced a distinct disturbance on the recorder. The man walked along the seismic path until he passed the receiver. He then made a right angle left turn perpendicular to the seismic line and continued to walk until he was out of the region. After the man left the range of detection and the seismic disturbance ceased, the electronic system was no longer disturbed and the output was once again a smooth, continuous sine wave.

FIG. 3 depicts yet another illustrative embodiment of the invention. This embodiment differs from that shown in FIGS. 1 and 2 in that no external oscillator is employed to drive the transmitting transducer, e.g., at 77.5 Hz. In the embodiment shown in FIG. 3, a closed loop seismic electric feedback is employed and no external oscillator is necessary.

As shown, the output from a receiving transducer 16" is fed, via an amplifier 18" and another amplifier 11" to a transmitting transducer 12". A lock-in amplifier 15" and a VTVM 20 are connected to the loop, intermediate amplifiers 18" and 11".

Using an amplifier phase shifter, and depending upon natural noise, the system was adjusted until feedback oscillation occurred. Output from the balanced feedback circuit was then fed into the lock-in amplifier 15" where it was heterodyned with the internal oscillator signal of fixed frequency. This combined output was fed to a recorder 19" and displayed in the form of a sine wave. Again, so long as no disturbance of the seismic path occurs, the feedback will oscillate at a constant frequency. If a disturbance should occur, however, the output will show a change in its periodicity. A permanent oscillator change (static) corresponds to a permanent change of the seismic feedback system, whereas, a transitory change (dynamic), such as caused by a moving object, corresponds to a Doppler frequency shift.

A disturbance was created by a man rolling a 100 lb. barrel along the path between the two transducers. As the disturbance began, a gradual shift in the repetitive wave being displayed was observed and this disturbance, a Doppler frequency shift, continued until the man and barrel were no longer in the seismic feedback path. After the disturbance ceased, the seismic system again resumed its initial operation; the original feedback system was re-established. No further Doppler frequency shift was observed and a continuous repetitive sine wave was once again displayed on the recorder. The magnitude of the Doppler frequency shift, obtained by graphical analysis of the recorded data was found to be approximately 0.25 Hz.

In another experiment, the subject rolled the barrel perpendicularly to the seismic transmission path and cut across the seismic path midway between the two transducers. As the man crossed the seismic path, the initial feedback loop that had been set up on balance was disturbed. An indication was shown on the recorder as a frequency shift in the recorded signal. As the man left the area, a continuous seismic wave was again displayed. During the interruption of the seismic path by the man and barrel, a Doppler frequency shift of approximately 0.94 Hz was obtained by graphical analysis of recorded data. The amount of amplitude and phase shift observed was found to be a function of the distance of the disturbing object from the transmitting (or receiving) transducer.

In general, the phase and amplitude of the received CSW signal will be changed by insertion of an object into the seismic wave transmission path between the transmitter and receiver transducers.

As discussed, the preferred means for coupling seismic energy into the earth is a tree. However, other vegetation such as bushes, etc. may also be used, provided it has an adequate root system.

Interestingly, the application of seismic energy to trees, etc., may be of some use in controlling or preventing pest infestations, for example, in apple orchards, and the like. It may also have a stimulating effect on their growth.

In the experiments described above, the transducers used were Electrophonics Transducers manufactured by U.S. Electronics Product Corporation; the audio oscillator was a Hewlett-Packard 200 C-D; and the lock-in amplifier was a model PAR-JB-5. The recording device was a Texas Instruments Rectiwriter.

Although developed originally for military purposes, it will be evident that the invention disclosed herein has application to civilian surveillance needs. For example, it may be used to guard the perimeter of large industrial plants, large private estates and even may be used as a burglar or intruder alarm in private, single-family residences. In these latter embodiments, a simple burglar alarm bell would be substituted for the recorder disclosed in FIGS. 1–3.

One skilled in the art may make various changes and substitutions to the arrangement of parts shown without departing from the spirit and scope of the invention.

What is claimed is:

1. A method of detecting the presence of an intruder in an area under surveillance, comprising the steps of:
   seismically exciting the trunk of an arboreal plant growing in said area, thereby to propagate a seismic wave in the earth via the roots of said plant;
   detecting said seismic wave through seismic vibrations coupled from the earth to the trunk of a second arboreal plant growing in said area, via the roots of said plant;
   comparing the phase of the detected seismic wave with the phase of the exciting wave; and then
   detecting the presence of said intruder by the changes induced in the relative phase of said two compared waves as said intruder walks on the earth through which said seismic wave is propagating.

2. The method according to claim 1 wherein the frequency of the exciting seismic wave is higher than the frequency of the natural microseismic noise produced by the motion of the root systems of other plants and bushes in said area, in response to the wind.

3. A method of detecting the presence of an intruder in an area under surveillance, comprising the steps of:
   seismically exciting the trunk of an arboreal plant growing in said area, thereby to propagate a seismic wave in the earth via the roots of said plant;
   detecting said seismic wave through seismic vibrations coupled from the earth to the trunk of a second arboreal plant growing in said area, via the roots of said plant;
   heterodyning the detected seismic wave with the output of an oscillator of known frequency; and then
   detecting the presence of said intruder by the changes in amplitude and frequency in the heterodyned signal as said intruder walks on the earth through which said seismic wave is propagating.

4. The method according to claim 3 wherein the frequency of the exciting seismic wave is higher than the frequency of the natural microseismic noise produced by the motion of the root systems of other plants and bushes in said area, in response to the wind.

5. A method of detecting the presence of an intruder in an area under surveillance, comprising the step of:
   coupling a seismic transmitter to the trunk of an arboreal plant growing in said area to propagate a seismic wave into the earth, via the roots of said plant, when said transmitter is excited;
   coupling a seismic receiver to the trunk of a second arboreal plant growing in said area to detect said seismic wave through seismic vibrations coupled from the earth, via the roots of said second plant;
   amplifying said detected seismic wave in an amplifier;
   applying said amplified seismic wave to said seismic transmitter thereby to establish a closed seismic loop;
   adjusting the gain of said amplifier until said seismic loop oscillates at its natural frequency; and then
   detecting the presence of said intruder and his velocity through said area by the Doppler frequency shift induced in said natural frequency as said intruder walks on the earth comprising said closed seismic loop.

6. A seismic surveillance system for detecting the presence of an intruder in an area under surveillance, which comprises:
   a seismic transmitter for mounting to the trunk of an arboreal plant growing in said area;
   means for exciting said seismic transmitter whereby a seismic wave is propagated into the earth via the roots of said arboreal plant;
   a seismic receiver for mounting to the trunk of a second arboreal plant growing in said area, said receiver detecting said seismic wave through vibrations coupled from the earth to said trunk via the roots of said second plant;
   means, connected to said exciting means and said seismic receiver, for comparing the phase of said seismic wave as transmitted with the phase thereof as received; and
   detector means, connected to said phase comparing means, for detecting the presence of said intruder by detecting changes in the relative phase of said transmitted and received seismic wave.

7. The system according to claim 6 further comprising:
   a first amplifier connecting said exciting means to the input of said seismic transmitter;

a second amplifier connecting the output of said seismic receiver to said phase comparing means; and a variable phase element connected between said exciting means and said phase comparing means to null the phase difference between said transmitted and received seismic wave.

8. A seismic surveillance system for detecting the presence of an intruder in an area under surveillance, which comprises:

a seismic transmitter for mounting to the trunk of an arboreal plant growing in said area;

means for exciting said seismic transmitter whereby a seismic wave propagated into the earth via the roots of said arboreal plant;

a seismic receiver for mounting to the trunk of a second arboreal plant growing in said area, said receiver detecting said seismic wave through vibrations coupled from the earth to said trunk via the roots of said second plant;

means, connected to said seismic receiver, for heterodyning said detected seismic wave with a local oscillation of predetermined frequency; and detector means, connected to said heterodyning means, for detecting the presence of said intruder by detecting frequency and amplitude modulations superimposed upon said heterodyned signal by said intruder.

9. The system according to claim 8 further comprising:

a variable phase circuit connected to the output of said exciting means;

a first amplifier connected between said variable phase circuit and said seismic transmitter; and a second amplifier connected between the output of said seismic receiver and said heterodyning means.

10. A seismic surveillance system for detecting the presence of an intruder in an area under surveillance, which comprises:

a seismic transmitter for mounting to the trunk of an arboreal plant growing in said area;

a seismic receiver for mounting to the trunk of a second arboreal plant growing in said area;

amplifying means, interconnecting said seismic transmitter and said seismic receiver, for establishing a closed seismic loop including the root system of said first and second arboreal plants and the earth beneath said area, said loop oscillating at its natural frequency; and means, connected to said closed loop, for detecting the presence of an intruder in said area by detecting Doppler frequency changes in said natural frequency caused by said intruder.

11. The system according to claim 10 wherein said amplifying means comprises first and second amplifiers connected in series; and said detecting means includes:

heterodyning means, connected to the junction of said first and second amplifiers, for heterodyning the output of said seismic receiver with a locally generated oscillation of predetermined frequency.

* * * * *